United States Patent
Yalamanchi et al.

(10) Patent No.: US 7,127,467 B2
(45) Date of Patent: Oct. 24, 2006

(54) MANAGING EXPRESSIONS IN A DATABASE SYSTEM

(75) Inventors: Aravind Yalamanchi, Nashua, NH (US); Dieter Gawlick, Palo Alto, CA (US); Jagannathan Srinivasan, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 499 days.

(21) Appl. No.: 10/254,383

(22) Filed: Sep. 24, 2002

(65) Prior Publication Data

US 2003/0212670 A1 Nov. 13, 2003

Related U.S. Application Data

(60) Provisional application No. 60/378,018, filed on May 10, 2002.

(51) Int. Cl.
*G06F 17/30* (2006.01)
(52) U.S. Cl. ...................................................... 707/102
(58) Field of Classification Search ............... 707/1–10, 707/100–104.1, 700–205; 715/523; 717/108, 717/126
See application file for complete search history.

(56) References Cited

U.S. PATENT DOCUMENTS

| | | | |
|---|---|---|---|
| 4,815,030 A | 3/1989 | Cross et al. | |
| 5,072,405 A | 12/1991 | Ramakrishna et al. | |
| 5,446,885 A | 8/1995 | Moore et al. | |
| 5,680,602 A | 10/1997 | Bloem et al. | |
| 5,870,552 A | 2/1999 | Dozier et al. | |
| 5,873,075 A | 2/1999 | Cochrane et al. | |
| 5,873,084 A | 2/1999 | Bracho et al. | |
| 5,970,244 A | 10/1999 | Nagahashi et al. | |
| 6,021,443 A | 2/2000 | Bracho et al. | |
| 6,038,601 A | 3/2000 | Lambert et al. | |
| 6,067,540 A | 5/2000 | Ozbutun et al. | |
| 6,122,639 A | 9/2000 | Babu et al. | |

(Continued)

FOREIGN PATENT DOCUMENTS

EP 0743596 A2 11/1996

(Continued)

OTHER PUBLICATIONS

Gianluigi Greco et al., Event choice datalog: a logic programming language for reasoning in multiple dimensions, 2004, ACM Press, pp. 238-249.

(Continued)

*Primary Examiner*—Diane D. Mizrahi
(74) *Attorney, Agent, or Firm*—Hickman Palermo Truong & Becker LLP; John D. Henkhaus (57) ABSTRACT

A method for managing expressions includes receiving a first query that includes a first conditional expression. The first expression is then represented as data in a column of a table. A second query is received that specifies a first set of criteria, and the second query is executed to select data based at least on whether expressions in the column satisfy the first set of criteria. In an embodiment, the second query further specifies a second set of criteria, wherein executing the second query includes selecting data based on whether data in columns other than the expression column satisfy the second criteria. A special index is defined, which can be created on the column that stores the expressions as data, to filter large sets of expressions efficiently. A method of evaluating an expression set stored as data in a table classifies each predicate from each expression, and filters the expression set based on the predicate classification.

37 Claims, 4 Drawing Sheets

U.S. PATENT DOCUMENTS

| | | |
|---|---|---|
| 6,285,997 B1 | 9/2001 | Carey et al. |
| 6,401,090 B1 | 6/2002 | Bailis et al. |
| 6,405,191 B1 | 6/2002 | Bhatt et al. |
| 6,427,146 B1 | 7/2002 | Chu |
| 6,442,568 B1 | 8/2002 | Velasco et al. |
| 6,502,093 B1 | 12/2002 | Bhatt et al. |
| 6,604,093 B1 | 8/2003 | Etzion et al. |
| 6,604,100 B1 | 8/2003 | Fernandez et al. ............. 707/3 |
| 6,681,383 B1 | 1/2004 | Pastor et al. ................ 717/126 |
| 6,691,155 B1 | 2/2004 | Gottfried |
| 6,850,893 B1 | 2/2005 | Lipkin et al. .................. 705/8 |
| 6,901,410 B1 | 5/2005 | Marron et al. |
| 6,917,946 B1 | 7/2005 | Corl, Jr. et al. ............. 707/102 |
| 2001/0047270 A1 | 11/2001 | Gusick et al. |
| 2002/0062475 A1 | 5/2002 | Iborra et al. ................ 717/108 |
| 2002/0152149 A1 | 10/2002 | Tanaka |
| 2003/0046421 A1 | 3/2003 | Horvitz et al. ............. 709/238 |
| 2003/0120642 A1 | 6/2003 | Egilsson et al. |
| 2003/0236834 A1 | 12/2003 | Gottfried |
| 2004/0181543 A1 | 9/2004 | Wu et al. ................... 707/102 |
| 2004/0193575 A1 | 9/2004 | Chen et al. ..................... 707/3 |
| 2005/0203940 A1* | 9/2005 | Farrar et al. ................ 707/102 |
| 2005/0222978 A1* | 10/2005 | Drory et al. ................... 707/3 |

FOREIGN PATENT DOCUMENTS

| | | |
|---|---|---|
| EP | 0 959 416 A2 | 11/1999 |
| GB | 2 274 182 A | 7/1994 |
| GB | 2 354 847 A | 4/2001 |
| GB | 2 354 848 A | 4/2001 |
| JP | 05089143 | 4/1993 |
| JP | 06319024 | 11/1994 |
| WO | WO 98/33131 A1 | 7/1998 |
| WO | WO 01/08048 | 2/2001 |
| WO | WO 01/88795 A1 | 11/2001 |
| WO | WO 03/098479 A | 5/2003 |

OTHER PUBLICATIONS

Charles L. Forgy, "Rete: A Fast Algorithm for the Many Pattern/ Many Object Pattern Match Problem," *Artificial Intelligence*, 1982, pp. 17-37.

Marcos K. Aguilera, et al., "Matching Events in a Content-based Subscription System," 1999, Symposium on Principles of Distributed Computing, 9 pages.

Umeshwar Dayal, et al., "Active Database System," *Modern Database Systems: The Object Model, Interoperability, and Beyond*, Addison-Wesley, Reading, Massachusetts, Sep. 1994, 25 pages.

Jagannathan Srinivasan, et al., "Extensible Indexing: A Framework For Intregrating Domain-Specific Indexing Schemes Into Oracle8i," Oracle Corporation, 16th International Conference on Data Engineering, Feb. 28- Mar. 3, 2000, San Diego, California, 10 pages.

Patrick O'Neil, et al., "Improved Query Performance with Variant Indexes," SIGMOD '97 5/97, Tucson, Arizona, USA, pp. 1-12.

Eric N. Hanson, et al., "Optimized Rule Condition Testing in Ariel using Gator Networks," Oct. 23, 1995, University of Flordia, TR-95-027, pp. 1-24.

M.F. Wyle, "A Wide Area Network Information Filter," Proceedings International Conference on Artificial Intelligence Applications on Wall Street, 9 Oct. 1991, New York, US, Los Alamitos, CA Oct. 9, 1991, XP000534152, pp. 10-15.

Jim Binkley, et al: "Rama: An Architecture for Internet Information Filtering," Journal of Intelligent Information Systems, vol. 5, No. 2, Sep. 1, 1995, XP000617268, pp. 81-99.

Patrick A. O'Donnell, et al., "Deadlock-Free and Collision-Free Coordination of Two Robot Manipulators," 1989, IEEE, XP 000041486, pp. 484-489.

Clara Nippl, et al., "Accelerating Profiling Services by Parallel Database Technology," undated, 9 pages.

Norman W. Paton, et al., "Active Database Systems," Mar. 1999, ACM Computing Surveys, vol. 31, No. 1., pp. 63-103.

International Searching Authority, "Notification of Transmittal of the International Search Report or the Declaration," Feb. 12, 2004, 9 pages.

IBM Corp., "Improved Rete Algorithm —Hashing Techniques Applied to Partial Match Memories," IBM Technical Disclosure Bulletin, vol. 35, No. 3, Aug. 1992, p. 149.

Segev, A. et al., "Rule Activation Techniques in Active Database Systems", Journal of Intelligent Information Systems, 7(2):173-194, Oct. 1996, 23 pages.

International Preliminary Examining Authority, International Preliminary Examination Report, in regards to PCT application PCT/US 03/14892, dated May 24, 2005, 9 pages.

Current Claims of International Application PCT/US 03/14892, pp. 1-5.

Current Claims in PCT application, International Application No. PCT/US03/23747, 14 pages.

International Searching Authority, "Notification of Transmittal of the International Search Report or the Declaration," dated May 25, 2004, 6 pages.

Kei Kurakawa et al., "Life Cycle Design Support Based on Environmental Information SHaring," IEEE, Feb. 1-3 1999, Proceedings EcoDesign '99, First International Symposium, pp. 138-142.

Oliver Gunther, et al., "MMM: A Web-Based System for Sharing Statistical Computing Modules," IEEE, May-Jun. 1997, vol. 1, Issue 3, pp. 59-68.

PCT Written Opnion from corresponding PCT/US03/14892.

International Searching Authority, "Notification of Transmittal of the International Search Report and the Written Opinion of the International Searching Authority, or the Declaration," PCT/US2005/009598, dated Nov. 29, 2005, 18 pages.

Current Claims, PCT/US2005/009598, 6 pages.

Bea, :Using Expressions and Conditions, WebLogic Process Integrator Release 1.1, 2000, located on the internet at http://e-docs.bea.com/wlpi/wlpil1/studio/ch6.htm retrieved on Dec. 29, 2005, 12 pages.

Chamberlain, Don, "Query Languages and XML," Powerpoint Presentation, IBM Almaden Research Center, Dec. 2000, located on the internet at http://www-db.sc.wisc.edu/dbseminar/fall00/talks/chamberlain, 26 pages.

Chamberlain, Don et al., "XQuery: A Query Language for XML," W3C Working Draft, Feb. 15, 2001, located on the internet at http://www.w3.org/TR/2001/WD-xquery-20010215/ retrieved on Dec. 29, 2005, 83 pages.

Clark, James et al., "XML Path language (XPath), Version 1.0," W3C, 1999, located on the internet at http://www.w3.org/TR/xpath.html, retrieved on Dec. 29, 2005, 37 pages.

Krishnaprasad, Muralidhar et al., "Query Rewrite in Oracle XML DB," Proceeding of the 30th VLDB Conference, 2004, pp. 1134-1145.

Unknown Author, unknown title, located on the internet at www.cs.uku.fi/kilpelai/RDK01/lectures/Xquery.pdf 2001, 10 pages.

Communication pursuant to Article 96(2) EPC received in corresponding European application, Application No. 03753016.9 (5 pages).

Grosof, Benjamin N. et al., "SweetDeal: Representing Agent Contracts with Exceptions using XML Rules, Ontologies, and Process Descriptions," XP002354519, pp. 340-348.

Paton, Norman W. et al., "Active Database Systems," ACM Computing Surveys, vol. 31, No. 1, Mar. 1999, XP002354519, pp. 63-103.

\* cited by examiner

|  | ┌─ 102 | ┌─ 104 | ┌─ 106 |
| --- | --- | --- | --- |
| NAME | AGE | CITY | INTEREST |
| SCOTT | 37 | NEW YORK | SYMBOL = 'CSCO' and PRICE > 25 |
| ANDY | 45 | SEATTLE | SYMBOL = 'MSFT' and CHANGE/PRICE > 0.1 |
| STEVE | 29 | NEW YORK | SYMBOL = 'ORCL' and PRICE > 30 and CHANGE > 5 |
| ADAM | 32 | SAN JOSE | SYMBOL = 'INTC' and CHANGE/PRICE < -0.1 |

MANAGING EXPRESSIONS IN A DATABASE SYSTEM

CROSS REFERENCE TO RELATED APPLICATIONS

This application is related to and claims the benefit of priority from U.S. Provisional Patent Application No. 60/378,018 entitled "Managing Expressions In A Database System," filed on May 10, 2002, which is incorporated by reference in its entirety for all purposes, as if fully set forth herein.

FIELD OF THE INVENTION

The present invention relates generally to database management systems and, more specifically, to techniques for managing conditional expressions in database systems.

BACKGROUND OF THE INVENTION

In the context of event and content-based subscription systems, events are defined which, when met, trigger an action. For example, a subscriber can define rules that include events that define a state of content that, when met, trigger transmission of content to the subscriber. Using a database management system as an underlying engine for an event-based subscription system, a subscriber can register queries with the system that represent conditional expressions on the content of the events. In such a subscription or similarly functioning system, a potentially very large set of queries, i.e., an expression set on the content, are registered to manage the publication of desired content data. When a given data item becomes available, these conditional expressions are filtered to find those expressions that match the given data item.

A simple but inefficient approach to the task of filtering expression sets is to test all of the expressions in a given set for each data item. However, this approach is scalable neither for a large set of expressions nor for a high rate of events. Therefore, most commercial systems pre-process the expression set and create in-memory matching networks (i.e., specialized data structures) that group matching predicates in the expression set and share the processing cost across multiple expressions.

Matching networks are decision trees in which each node represents a predicate group in a given expression set. Data flows from a parent node to its children only if the data evaluates to true for the predicate representing the parent node. A path from the root of the decision tree to a leaf node represents all the conjunctions in an expression. The leaf nodes in the tree are labeled with expression identifiers and if a data item passes the predicate test on a leaf node, the corresponding expressions are considered true for that data item. Many variants of the matching networks (like RETE, TREAT and Gator networks) are in use for the existing systems.

In existing systems, any operation requiring filtering of expressions and related information requires significant custom coding and reduces performance characteristics. Furthermore, the number of expressions is limited in size as the corresponding matching networks must fit in main-memory, changes in expressions are costly, and users are unable to adjust filtering strategies to the structure and use of the expressions and related data.

Based on the foregoing, it is clearly desirable to provide an improved mechanism for managing expressions, such as expressions associated with a subscription system. In addition, there is a more specific need for a mechanism that provides the ability to filter expressions in conjunction with filters on other related information.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and system are described for managing expressions in a database system. In addition, and more specifically, methods and systems are described for managing conditional expressions associated with event and content-based information subscription systems.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Conditional expressions, often in the form of standard database query, are represented as data in a column of a table. These expressions may represent, for example, data filters for filtering data in an information subscription system. Another standard database query, which specifies criteria, can then be executed on the column to determine whether expressions in the column meet the specified criteria. The criteria may represent, for example, incoming data to a subscription system.

Thus, the expression processing mechanism described herein is integrated with database technology by treating the expressions as data that can be queried along with other related user-specified data. For example, a publisher may include in the query other filtering criteria related to its subscribers.

In an embodiment, a first query is received that includes a first conditional expression. For example, the first query may be received via INSERT or database load operations. The first expression is then represented as data in a column of a table. A second query is received that specifies a first set of criteria, and the second query is executed to select data based at least on whether expressions in the column satisfy the first set of criteria. For example, the second query may be received from a user of a database application.

In an embodiment, the second query further specifies a second set of criteria, wherein executing the second query includes selecting data based on whether data in columns other than the column satisfy the second criteria.

Other embodiments include receiving the first query from a subscriber to an subscription service or system, wherein the first expression specifies criteria that must be satisfied by data for the data to be of interest to the subscriber; and receiving the second query from a publisher associated with the subscription system, wherein the second query specifies criteria that must be satisfied by data, with respect to the subscriber, for the data to be published to the subscriber. Thus, mutual filtering can be performed on data by both subscribers and publishers.

According to one aspect, a special index is defined on the column that stores the expressions as data, to filter large sets of expressions efficiently.

In an embodiment, predicates in the expressions are grouped based on the commonality of their left-hand sides, i.e., common identifiers associated with criteria of the first expressions. These groups are persistently stored in a database. Further, operators and constants associated with the predicates are stored in a predicate table in association with respective predicate groups, and an index, such as a concatenated bitmap index, is created based on the operators and constants.

Managing Expressions in a Database System

Typically, in event and content-based subscription systems, a set of expressions or rules (e.g., Event-Condition-Action (ECA) rules) is defined for an event structure or context, and the structure of the event determines the elementary attributes that can be used in the expressions. The term "event" is used in this context to refer to the data item for which expressions, or "conditions", are evaluated. For example, an event, in the context of stock trading, might be a publicly-traded stock attaining a particular price, which is represented as a data item. Thus, elementary attributes of expressions associated with such an event could include, for example, SYMBOL, PRICE, and CHANGE. An ECA rule lies dormant until it is triggered by the occurrence of an Event.

A set of expressions defined for an event structure or context is called an expression set. For example, Subscriber A may be interested in an event expressed as SYMBOL=ORCL, PRICE>30, and CHANGE>5; Subscriber B may be interested in an event expressed as SYMBOL=CSCO, and PRICE>25; and Subscriber C may be interested in an event expressed as SYMBOL=INTC, and CHANGE/PRICE>0.1.

In a typical system based on rules, for example, a content-based subscription system, efficient filtering of a large set of conditional expressions is critical for the scalability of the system. Unlike a typical database design, where a few queries are executed on a large set of rows in a table, a rules-based system has a large number of expressions (similar to WHERE clause of a query) operating against a single data item.

The expressions defined for an application are relatively static and the rate at which the new data should be processed against these expressions is high. Therefore, according to one aspect, pre-processing of the expressions is performed to build specialized data structures and data access mechanisms such as indexes, to allow fast filtering with a new data item.

Pre-Processing a Set of Expressions

Given a large number of conditional expressions in a system, the expressions tend to have similarities at the elementary predicates level. That is, two expressions, each with one or more elementary predicates joined by conjunctions, may have a common predicate. Thus, expression evaluation costs are shared among multiple expressions, thereby leveraging the foregoing similarities. In an embodiment, a library of functions, the Expression Type Library, supports the pre-processing of a set of expressions.

The Expression Type Library provides the basic functionality required for building a matching network for expressions. This library is supplied as a set of Java classes which are capable of converting an expression string into an expression tree containing elementary predicates, joined by conjunctions and disjunctions. This library can be used by any indexing scheme for pre-processing the expressions in an expression set and during incremental modifications to these expressions.

This library parses the expressions and processes them as follows (1) Normalize the expression, for example, by rearranging the predicates in an expression to rewrite it in a disjunctive normal form (DNF), that is, an OR list of AND sub-clauses. For example, an expression of form SYMBOL='GE' and (PRICE<25 or PRICE>35)

is rewritten as follows after a DNF conversion:

(SYMBOL='GE' and PRICE<25) or
(SYMBOL='GE' and PRICE>35).

(2) Normalize the predicates, by rewriting each predicate in an expression such that it has a pure constant on the right-hand side. For example, a predicate of form

PRICE>27+CHANGE is rewritten as:

PRICE−CHANGE>27

(3) Decode the predicate, by resolving it as follows:

left-hand side (LHS): an expression or a function of one or more attributes (e.g., PRICE−CHANGE from the predicate PRICE−CHANGE>27);

right-hand side (RHS): a constant (e.g., the "27" from the predicate PRICE−CHANGE>27); and relational operator: the relational operator joining the LHS and RHS (e.g., the ">" from the predicate PRICE−CHANGE>27).

The left-hand side of a predicate, for example, the attribute SYMBOL, is also referred to as a complex attribute. It could also be a sub-expression involving one or more elementary attributes or user-defined functions, for example, CHANGE/PRICE. The operators of a predicate are mapped to a predetermined integer value, however, embodiments are not limited to such a mapping. The mapped operators and associated predicate constants (RHS) are stored in a predicate table, which is described in more detail below. In an implementation, predicates involving constructs such as IN lists, sub-queries, etc. are not grouped with other predicates.

Attribute Set

According to an aspect of the invention, an attribute set that captures the event structure or context is created. The attribute set has a list of elementary attributes used in an expression set, and their data types. In its simplest form, the attribute set resembles an abstract type definition in the database. For example, a set of elementary attributes used in an expression set constitutes its attribute set.

One non-limiting technique for creating an attribute set is expressed in the following commands:

```
EXECUTE dbms_expeng.create_attribute_set (
          attr_set => 'TICK');
EXECUTE dbms_expeng.add_elementary_attribute (
          attr_set => 'TICK',
          attr_name => 'SYMBOL',
          attr_type => 'VARCHAR2(6)');
EXECUTE dbms_expeng.add_elementary_attribute (
          attr_set => 'TICK',
          attr_name => 'PRICE',
          attr_type => 'NUMBER');
EXECUTE dbms_expeng.add_elementary_attribute (
          attr_set => 'TICK',
          attr_name => 'CHANGE',
          attr_type => 'NUMBER');
``` whereby an attribute set "TICK" is created, having elementary attributes "SYMBOL", "PRICE", and "CHANGE".

Significantly, the expression set is stored in a column of a table. For example, expressions can be stored in a VARCHAR2 or a CLOB column in a database table. Such a column can be recognized as a column of EXPRESSION data type by, for example, associating some expression set metadata to the column. Furthermore, the column storing the expression set is associated with the attribute set created for the expression set. One non-limiting technique for associating an attribute set with an expression set is expressed in the following commands:

```
EXECUTE dbms_expeng.assign_attribute_set (
          attr_set => 'TICK',
          tab_name => 'TRADER',
          exp_column => 'INTEREST');
``` whereby the attribute set "TICK" is associated with an expression set stored in column "INTEREST" of table "TRADER".

A VARCHAR2 or a CLOB column associated with an attribute set constitutes an EXPRESSION column. The values stored in an EXPRESSION column are treated as expressions and they are initially expected to adhere to SQL-WHERE clause format that can include XPATH expressions. These expressions can use all the attributes defined in the attribute set along with any system variables and user-defined functions that are valid in the user environment, for example, UPPER(symbol)='*INTC*' AND change/price>0.1.

Expression Filter

According to an embodiment, an Expression Filter is a set of PL/SQL packages and APIs to manage expressions in user tables, and to filter the expressions for a given data item, that is, to match criteria expressed in expressions with the given data item, using a standard SQL or other query language query. In a publication system, the expressions specify criteria that must be satisfied by data for the data to be of interest to a subscriber. The Expression Filter comprises two components: an EVALUATE operator (described immediately below) and an Expression Filter Indextype (described under the heading "Creating An Index For The Expression Set").

Evaluate Operator

A new operator is introduced that processes the expression set stored in an EXPRESSION column. This operator can be used in the WHERE clause of a standard SQL, or a DML statement, to filter the expressions for a data item. The predicate on the expression set, using the new operator EVALUATE, can be combined with any other predicate on the table. The EVALUATE operator accepts the name of the column storing the expressions, e.g., INTEREST, and a given data item as arguments. The EVALUATE operator internally uses the expression set metadata to evaluate expressions for data items passed in.

An example of a query that uses the EVALUATE operator is as follows:

```
SELECT * FROM traders
  WHERE EVALUATE (traders.exp,
        'symbol=>"intc", price=>32, change=>3.3') = 1
  AND traders.city = 'New York'.
```

The expression is considered true if the query evaluates to true for given data item values.

The query on the table in which expressions are stored can be extended to include multi-table joins and any other database query operations using GROUP BY clause, ORDER BY clause, HAVING clause etc. In addition, filtering a set of expressions for a batch of data items by joining the table in which expressions are stored with the table storing the data items is contemplated. An example of such a query is as follows:

SELECT distinct (dataitems.symbol), count(*) FROM traders, dataitems

```
WHERE EVALUATE (traders.exp,
      tick.getVarchar(dataitems symbol,
          dataitems.price,
          dataitems.change)) = 1
  AND traders.city = 'New York'
  GROUP BY dataitems.symbol;
``` where TICK is the name of the attribute set defined for the expression set, TRADERS is a table that stores the expression set (see FIG. 1 for an example), and DATAITEMS is a table that stores the data items being processed, i.e., being compared to the expression set.

Creating an Index for the Expression Set

Testing every expression for a data item is a linear time solution. When a large set of expressions are defined, this approach is not scalable for a high volume of data items. Therefore, in an embodiment, a new indexing mechanism is used to evaluate a large set of expressions efficiently and, consequently, to quicken the evaluation of the expression set for a given data item or data string. This index can be defined on an EXPRESSION column, thus a query optimizer can determine the use of the index for the evaluation of an expression set, based on the index usage cost. In an implementation, persistent database objects are created to maintain the index for an expression set, where pre-processing the expressions set at the time of index creation populates these database objects. Additionally, the information stored in these objects is maintained to reflect any changes to the expression set using DML operations on the table storing the expressions.

Expression Filter Index Type

In an embodiment, the indexing scheme is implemented as a new Indextype, Expression Filter, using an extensible indexing framework. In an implementation, the indexing scheme is implemented as a new Indextype, Expression Filter, using the Oracle Extensible Indexing framework. The Expression Filter index type can be used to create an index on any set of expressions stored in a database column of type VARCHAR2, CLOB or BFILE. However, use of another index type other than the foregoing, which may be used on expressions stored as data types, is contemplated and therefore within the scope of embodiments of the invention.

The Expression Filter index type implementation parses a set of expressions and groups the predicates in the expressions into disjoint sets with matching Left-Hand-Sides. The data structures used to group the predicates in an expression set are relational in nature. In an implementation in which persistent database objects are used for the Expression Filter index data structure, an example of such database objects are as follows:

Predicate Table: a relational table that stores the predicates appearing in the expressions;

Bitmap Indexes: one or more bitmap indexes on the predicate table; and

Access Function: a function that queries the predicate table to filter the expressions for a data item.

These objects collectively provide for efficient filtering of expressions based on both equality and range predicates. Furthermore, since the index structure objects are persistently stored in the database, memory constraints associated with the size of expression sets in prior approaches, which typically use main memory extensively, are not applicable to the present embodiments. By contrast, operations using the present embodiments can store the necessary database blocks into a database buffer cache as they are needed.

As described above, expressions from a given set of expressions refer to a set of elementary attributes with fixed data types. Further, a set of valid values for these attributes constitute a data item, which is evaluated against these expressions. Hence, to index a set of expressions with the Expression Filter index type, all the elementary attributes used in the expression set should be associated with the database column storing the expressions. These elementary attributes, along with some optional complex attributes, constitute the attribute set for the expression set, which are stored in one or more data dictionary tables. One non-limiting technique for creating an Expression Filter index as described above is expressed in the following commands, which create an index TRADERFILTER on the INTEREST column of table TRADER in which the expressions are stored. Additionally, the index is configured to filter the predicates involving SYMBOL and PRICE attributes efficiently by defining bitmap indexes on such attributes.

```
CREATE INDEX traderfilter ON trader ( interest )
    INDEXTYPE IS EXPFIL.EXPFILTER
    PARAMETERS ('STOREATTRS (symbol, price, change)
        INDEXATTRS (symbol, price)').
```

The parameters passed to the CREATE INDEX statement determine the structure of the objects (predicate table, bitmap indexes and access function) used for the Expression Filter index and, therefore, influence the performance of the filter. The PARAMETERS clause in the CREATE INDEX statement is optional and in the absence of this clause, all the elementary attributes (with native types) in the attribute set are stored and indexed.

In an embodiment, a concatenated bitmap index is created on the predicate table's operator and RHS constant columns for frequent LHSs. For example, the LHS attribute SYMBOL is frequently used in expressions regarding stock quotes, so a bitmap index might be created on operator and constant columns associated with predicates that include the SYMBOL attribute, and combined into a concatenated bitmap index. These bitmap indexes function as a multi-dimensional index during the expression set evaluation.

Generally, utilization of the indexing scheme described herein, implemented as a new Indextype (i.e., Expression Filter index type) and applied to a column storing expressions as data, provides a method for efficiently evaluating large sets of expressions by allowing the new EVALUATE operator to use the Expression Filter index.

Predicate Evaluation

In an embodiment, in analysis of predicates, the predicates in an expression set are classified into three sets:

(1) Predicates with indexed attributes: bitmap indexes are created for the predicate groups belonging to this set, for example, popular predicate such as predicates that include the SYMBOL identifier;

(2) Predicates with Stored attributes: the predicate groups belonging to this set are parsed and stored in the predicate table with no indexes defined on the <operator, RHS constant>columns; and (3) Sparse predicates: the predicates belonging to this set are stored in their original form. If more than one sparse predicate exists for an expression, they are combined into one conjunction. Note that it is not always efficient to add a new set of columns to the predicate table for every predicate that cannot be grouped with others. Hence, according to an embodiment, a separate VARCHAR2 column, PARTIAL_CONDITION, is defined in the predicate table to hold the conditional expression for sparse predicates. Unlike other columns in the predicate table, this column is not indexed and it can hold one or more predicate definitions in conjunctive form.

A predicate falls into one of the above sets based on the cost of computing its left-hand side and the frequency of occurrence of its left-hand side in the expression set. The evaluation cost for a predicate depends on the set it belongs to.

Steps involved in evaluating a predicate, with respect to its classification as described above, are as follows.

(1) Indexed attribute: a one-time computation of the complex attribute (i.e., LHS of the predicate group), and one or more range scans on the bitmap indexes using the computed value;

(2) Stored attribute: a one-time computation of the complex attribute, and comparison of the computed value with the RHS of all the predicates in this group; and (3) Sparse predicate: parsing of the sub-expression representing the sparse predicate, and evaluation of the sub-expression through substitution of data values.

During the expression set evaluation, according to an embodiment, the expressions are filtered in three phases, as follows.

Phase 1: The predicates belonging to the Indexed attribute set are tested by performing a few range scans on the bitmap indexes defined thereon. The results from these scans are combined (bitmap AND operation) to obtain a set of expressions for which these predicates are all true for the given data item.

The total cost of this phase is defined as $$I* C11+N1*C12*\log(E1)+C13*E2;$$

where

I is the number of bitmap indexes used for filtering;

E1 is the number of expressions to be filtered;

C11 is the average bitmap index processing cost per index;

$C12*\log(E1)$ is the average cost of one index lookup;

C13 is the cost of fetching one row from the predicate table using the row identifier;

E2 is the number of expressions evaluated to true in Phase 1; and

N1 is the average number of lookups per bitmap index.

The result of Phase 1 is a set of expressions that evaluate to true with all the predicates belonging to the indexed attribute set.

Phase 2: For all the expressions evaluated to true in Phase 1, the predicates belonging to the Stored attribute set are tested.

The total cost of this phase is defined as $$S*C2*E2;$$

where

S is the average number of stored attributes per expression;

C2 is the average cost of one comparison;

E2 is the total number of expressions evaluated to true in Phase 1. Typically, the working set is narrowed down considerably in Phase 1 and E2<<E1.

The result of Phase 2 is a set of expressions that evaluate to true with the predicates belonging to the indexed or stored attribute sets.

Phase 3: For all the expressions that are true after Phase 2, the sparse predicates (if any) for these expressions are evaluated.

The total cost of this phase is defined as follows $$P*C3*E3;$$

where

P is the probability of a sparse predicate for an expression;

C3 is the average cost of parsing and evaluating a sparse predicate; and

E3 is the total number of expressions that are true after Phase 2 of filtering.

The result of Phase 3 is a set of expressions that evaluate to true for the given data item. Note that alternative access plans other than the index-based evaluation described above can be used.

Figure 1:
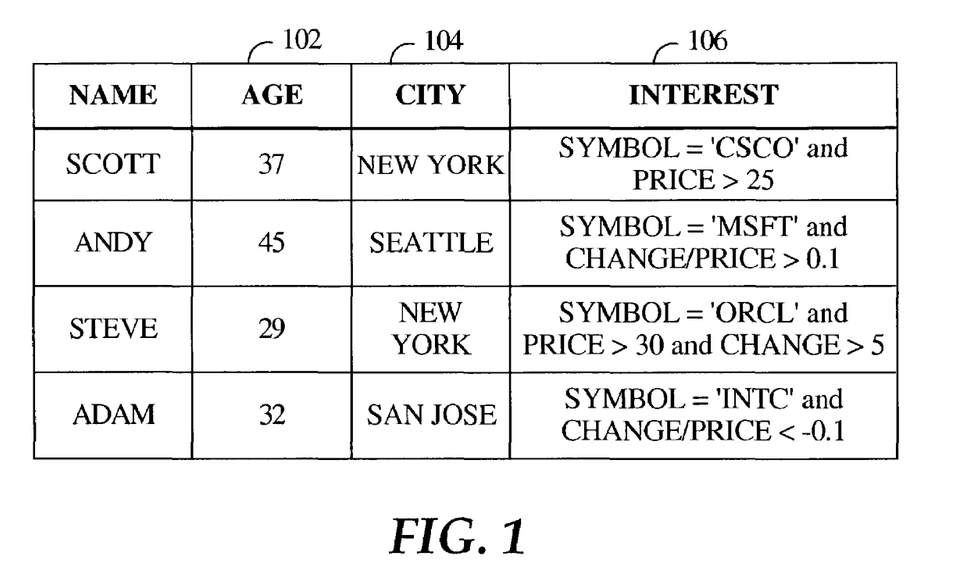
FIG. 1 is an example table used to support examples of processes or steps described herein.

Consider a database table TRADERS as illustrated in FIG. 1, which stores as conditional expressions information about stock traders and their interest in trading. In order to find all the TRADERS who are under 30 years of age, living in New York, and interested in a data item (SYMBOL='ORCL', PRICE=31, CHANGE=5.2), the following query is an example of a query that can be issued on the TRADERS table.

```
SELECT name, phone FROM traders
  WHERE EVALUATE (interest,
    'SYMBOL='ORCL', PRICE=>31, CHANGE=>5.2') = 1 AND
  city = 'New York' AND age < 30;
```

In practice, this query could make use of the predicate table and the bitmap indexes on the predicate table to filter the expressions. The Expression Filter index returns the rowids for all the expressions that evaluate to true with the given data item. Remaining predicates in the SELECT statement are evaluated on the corresponding rows to answer the query. In addition to the Expression Filter index on the INTEREST column, if the TRADERS table has native or extensible indexes defined on the CITY and AGE columns, an optimizer program may choose one or more of these indexes, based on the access cost, to answer the above query.

When a new row is inserted into the TRADERS table or some of the existing expressions are updated, the Expression Filter index is automatically maintained to reflect these changes.

As the foregoing example query illustrates, the techniques described herein integrate expression filtering operations into database operations. In the context of an information subscription-publication system, as a result of the integration of expressions and filtering mechanisms into a database system, mutual filtering from both a subscriber and a publisher can be performed, and performed efficiently, through use of standard SQL statements. Therefore, multi-domain queries are possible, by joining tables and adding predicates to a query to further filter expressions. Furthermore, batch evaluation of expression sets for a given set of data is possible by joining the table storing the expressions with the table storing the data items.

Prior approaches separate characteristics of system users or clients, such as name, telephone number and residence, from their respective interests in data, which is expressed in subscription expressions. Many applications can benefit from this integration of interests and personal characteristics. For example, a query could be executed to return "all traders in New York with an interest in Stock X exceeding a price of Y" or "all customers located within 10 miles of my store with an interest in vehicle Z." Significantly, present embodiments facilitate optimal filtering of expressions based on their context. For example, in the context of stock trading, this context leads to efficient filtering of data by grouping predicates on the SYMBOL attribute, since the vast majority of users will have interests relative to a specific stock represented by a stock symbol, and by indexing operators and constants associated with predicates that include the SYMBOL attribute.

Process for Managing Expressions in a Database

Figure 2:
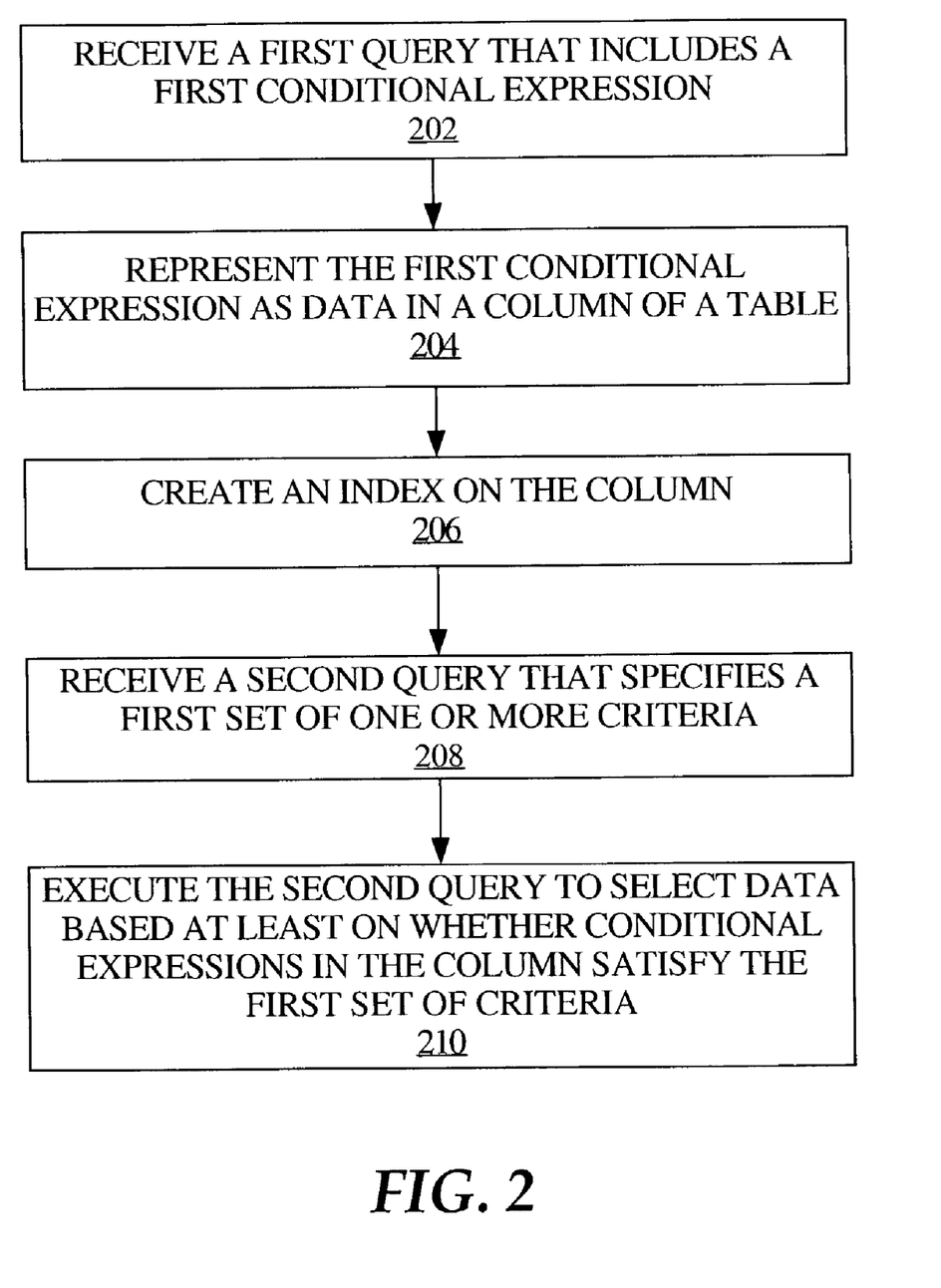
FIG. 2 is a flowchart that illustrates a process for managing expressions in a database.

FIG. 2 is a flowchart that illustrates a process for managing expressions in a database. FIG. 2 is described with additional reference to the table of FIG. 1.

At block 202, a first query is received that includes a first conditional expression. For example, the first query may be received via INSERT or database load operations. In an embodiment, conditional expressions are expected to be in the form of a SQL WHERE clause. Further, any SQL WHERE clause can be treated as an expression. In alternative embodiments, conditional expressions having a form other than a SQL query, and having a form other than any type of query, are contemplated. For example, a user may specify interests in data via simple textual input, which is converted directly into an appropriate data format, such as VARCHAR2 or CLOB, for storing in a column of a table.

In an embodiment, the first query is received from a subscriber to an information subscription system, or other event or content-based information publication system, wherein the expression specifies criteria that must be met by data for the data to be of interest to a particular subscriber. Thus, the first query can serve as a mechanism for a first level of filtering with respect to system data, essentially processing data for dispatch or publication to appropriate subscribers.

At block 204, the first conditional expression of the first query is expressed as data in a column of a table, as described above and as depicted as column 106 of FIG. 1. For example, one or more predicates constituent to the expression are encoded in a data format on which SQL or another query language can operate, and on which a database management system can manage. Note that the representation of expressions in the INTEREST column 106 of the table of FIG. 1 is for purposes of explanation, and do not take the form as depicted. Rather, the expressions stored in the INTEREST column, or any similar column in which expression representations are stored, are actually conventionally encoded into an appropriate data format.

At optional block 206, an index is created on the column of the table in which the conditional expressions are stored as data at block 204. In this embodiment, an index is created as described above.

Indexing steps include grouping predicates from a set of expressions, based on predicate identifiers that are associated with respective criteria of the first set of criteria. Continuing with the example, predicate group identifiers might include SYMBOL, PRICE, and CHANGE. Sets of predicate operators and constants are stored in a predicate table in association with respective predicate identifiers. For example, a predicate grouping for SYMBOL may have entries in the predicate table representing sets of operator and constant combinations, such as operator is "equal to" and constant is "ORCL", and a predicate grouping for PRICE may have entries in the predicate table that include operator and constant combinations such as "greater than or equal to" and "31". These sets of operators and constants can be encoded in any conventional manner appropriate for their purpose. Next, a concatenated bitmap index, or another form of index, is created based on a set of predicate operators and constants associated with a particular predicate identifier. For example, a set of operator and constant combinations, represented in respective columns of a predicate table, for the predicate identifier SYMBOL, is indexed for fast and efficient evaluation of predicates and thus, expressions, as part of a data filtering process.

At block 208, a second query is received that specifies a first set of one or more criteria. The following query is an example of a second query.

```
SELECT name, phone FROM traders
  WHERE EVALUATE (interest,
      'SYMBOL='ORCL', PRICE=>31, CHANGE=>5.2') = 1 AND
      city = 'New York' AND age < 30;
```

This query specifies the criteria, SYMBOL is equal to "ORCL", PRICE is greater than or equal to 31, and the CHANGE in PRICE is greater than or equal to 5.2. The second query may be received, for example, from a user of a database application.

In an embodiment, the second query is received from a publisher in an information subscription system, or other event or content-based information publication system, wherein the expression specifies a set of criteria that must be met by data for the data to be published to a particular subscriber. Thus, the second query can serve as a mechanism for a second level of filtering with respect to system data, essentially processing data for dispatch or publication to appropriate subscribers.

At block 210, the second query is executed to select data based at least on whether conditional expressions in column 106 satisfy the first set of criteria. For example, execution of the second query determines, among other things, whether a particular data item meets a condition or set of conditions as expressed in a stored expression in the data column 106. In other words, in the context of a subscription system, it is determined whether there are any subscribers that are interested, through the conditions or predicates specified in their expressions, in data meeting the criteria specified in the first part of the WHERE clause (before the AND conjunction) of the query.

In an embodiment, the second query further specifies a second set of criteria, wherein execution of the second query at block 210, includes selecting data based on whether data in one or more columns other than the expression column, such as columns 102, 104, satisfies the second criteria. For example, the second part of the WHERE clause (after the AND conjunction) specifies that other columns, CITY and AGE, are to be considered to determine whether a given data item being processed additionally satisfies the criteria of CITY (column 104) equals "New York" and AGE (column 102) is less than 30. The index created at block 206 is optional, but in instances in which an index is created, execution of the second query can utilize the index to evaluate the conditional expressions efficiently.

In practice, the second query can operate as a mutual filtering mechanism for considering more than one level or direction of filtering. For example, the second query above considers both subscribers' and publishers' data filtering interests. Significantly, the process described can operate in an information security related implementation, with the second set of criteria expressing security or authorization criteria regarding to whom particular information can or should be published or provided.

Figure 3A:
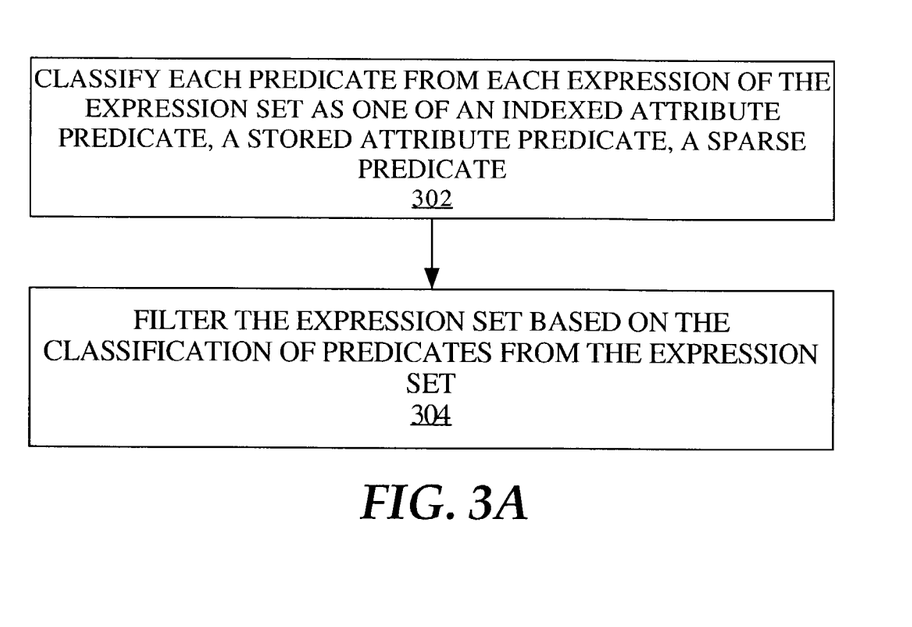
FIG. 3A is a flowchart that illustrates a process for evaluating an expression set that is stored as data in a column of a table.

Process for Evaluating an Expression Stored as Data in a Column of a Database Table FIG. 3A is a flowchart that illustrates a process for evaluating an expression set that is stored as data in a column of a table.

At block 302, each predicate form each expression of the expression set is classified as one of an indexed attribute predicate, a stored attribute predicate, and a sparse predicate. An indexed attribute predicate is a predicate that is chosen to be indexed, as described above, wherein the index is based on a set of operator and constant attributes that are stored in respective columns of a predicate table in association with a respective predicate identifier.

A stored attribute predicate is a predicate for which its operator and constant attributes are stored in respective columns of the predicate table in association with a respective identifier, but for which no index is created. For example, stored attribute predicates might not be indexed because their identifiers are not commonly used enough in the expression set, or they might be complex predicates that comprise operations with basic attributes (e.g., CHANGE/PRICE).

A sparse predicate, as described above, is a predicate in which a predicate identifier associated therewith is uncommon in the expression set. For example, a sparse predicate might be derived from a predicate with a BETWEEN operator, with multiple operators on the same attribute, with functions, and with a LIKE operator. A sparse predicate, and its associated operator and constant, is stored as data in the predicate table.

Figure 3B:
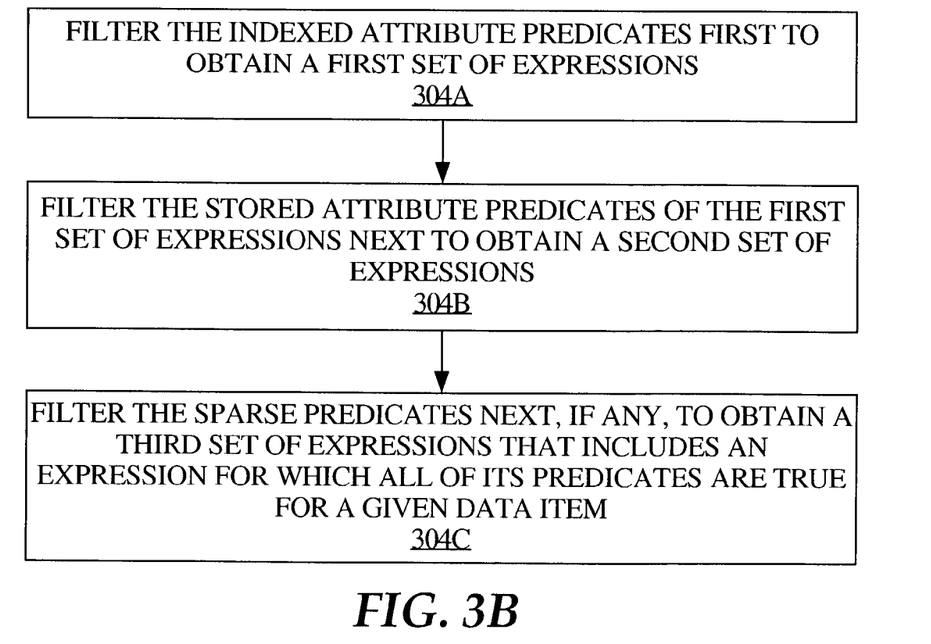
FIG. 3B is a flowchart that illustrates a step of filtering expressions based on predicate classifications.

At block 304, the expression set is filtered based on the classification of predicates performed at block 302. FIG. 3B is a flowchart that illustrates the step of filtering expressions based on predicate classifications, block 304.

At block 304A, the indexed attribute predicates are filtered first to obtain a first set of expressions that includes one or more expressions for which all of its indexed attribute predicates are true for a given data item. Second, at block 304B, the stored attribute predicates of the first set of expressions are filtered to obtain a second set of expressions that include one or more expressions for which all of it stored attributes are true for the given data item. Third, at block 304C, the sparse predicates of the second set of expressions, if any, are filtered to obtain a third set of expressions that includes one or more expressions for which all of its predicates are true for the given data item. Hence, the data item meets the criteria specified in the expression.

Hardware Overview

Figure 4:
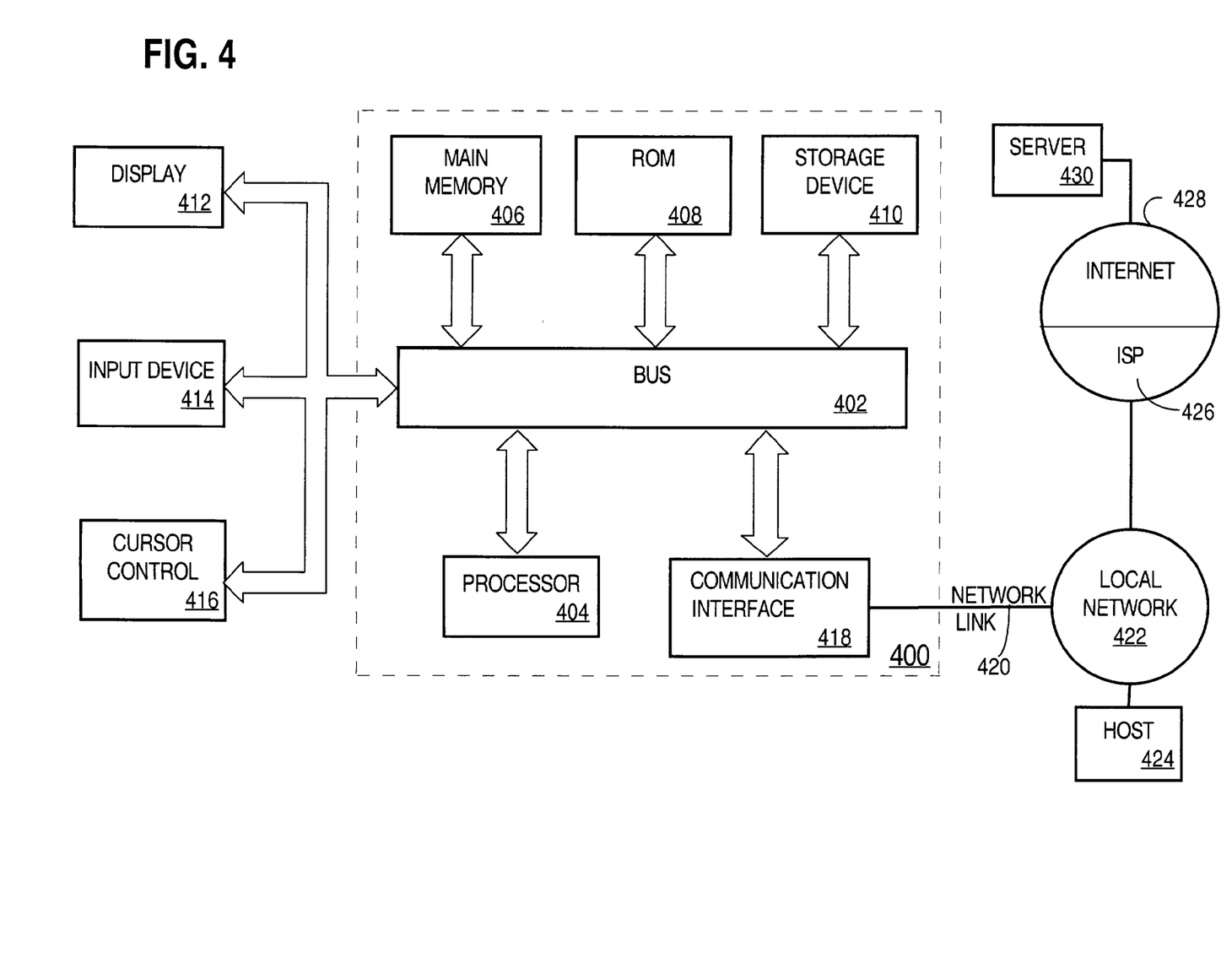
FIG. 4 is a block diagram that illustrates a computer system upon which an embodiment of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, optical disk, or magneto-optical disk, is provided and coupled to bus 402 for storing information and instructions.

Computer system 400 may be coupled via bus 402 to a display 412, such as a cathode ray tube (CRT) or a liquid crystal display (LCD), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical, magnetic, or magneto-optical disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

Extensions and Alternatives

Alternative embodiments of the invention are described throughout the foregoing description, and in locations that best facilitate understanding the context of the embodiments. Furthermore, the invention has been described with reference to specific embodiments thereof. It will, however, be evident that various modifications and changes may be made thereto without departing from the broader spirit and scope of the invention. For example, implementations were presented in which SQL is used; however, the techniques described herein are not limited to use with SQL, for other data query languages may be applicable. For another example, implementations were presented in the context of a subscriber/publisher system; however, advantages and use of embodiments of the invention are not limited to this context. For one more example, implementations were presented in which a concatenated bitmap index is created on columns of a predicate table. However, embodiments are not limited to such an index, for other index types that are suitable for indexing multiple columns of data tables are also applicable. Therefore, the specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A computer-implemented method for managing expressions in a database, the method comprising the steps of:

receiving a first query that includes an expression that defines a first condition relating to a first attribute;

representing the first condition as data in a column of a row of a table;

storing a first value in association with the data, wherein the first value relates to a second attribute;

receiving a second query that specifies a second value associated with the first attribute and a second condition relating the second attribute; and executing the second query, wherein executing the second query includes reading, from the column of the row, the data representing the first condition;

determining whether the second value satisfies the first condition;

reading the first value associated with the data;

determining whether the first value satisfies the second condition; and selecting data to answer the second query based at least on whether the second value satisfies the first condition, and the first value satisfies the second condition.

2. The method of claim 1, wherein the step of storing the first value in association with the data includes storing the first value in the row of the table.

3. The method of claim 2, wherein the step of storing the first value in association with the data includes storing the first value in a column that is different than the column in which the first condition is represented.

4. The method of claim 1, wherein the step of storing the first value in association with the data includes storing the first value in a table other than the table.

5. The method of claim 1, wherein the expression defines a plurality of conditions relating to a plurality of attributes, and wherein the column of the row of the table stores a representation of the plurality of conditions.

6. The method of claim 1, wherein the step of receiving a first query includes receiving the first query from a first user of a database application, and wherein the expression defines one or more conditions that must be satisfied by particular data for the particular data to be of interest to the user.

7. The method of claim 6, wherein the step of receiving a second query includes receiving the second query from a second user of a database application, and wherein the second condition must be satisfied by particular data for the particular data to be made available to the first user, thus enabling mutual filtering of data by the first user and the second user.

8. The method of claim 1, wherein the step of receiving a first query includes receiving the first query from a subscriber to an information subscription system, and wherein the expression defines one or more conditions that must be satisfied by particular data for the particular data to be of interest to the subscriber.

9. The method of claim 8, wherein the step of receiving a second query includes receiving the second query from a publisher in the subscription system, and wherein the second condition must be satisfied by particular data for the particular data to be published to the subscriber.

10. The method of claim 1, wherein the step of receiving a second query includes receiving the second query from a publisher in an information subscription system, and wherein the second query specifies a second set of one or more criteria that must be satisfied by data for the data to be published to a subscriber to the subscription system.

11. The method of claim 1, wherein the step of representing the first condition as data in a column includes representing a set of conditions from a plurality of first queries as data in the column, the method further comprising the steps of:

creating an index on the column of the table by
grouping predicates from the set of conditions based on predicate identifiers that identify respective attributes from a set of attributes on which the set of conditions are based;
storing in a predicate table sets of predicate operators and constants in association with respective predicate identifiers;
creating a concatenated bitmap index based on a set of predicate operators and constants associated with a particular predicate identifier.

12. A computer-implemented method for evaluating an expression set that is stored as data in a column of a table, the method comprising the steps of:
classifying each predicate from each expression of the expression set as one of,
an indexed attribute predicate, wherein a bitmap index is created based on a set of operator and constant attributes that are stored in respective columns of a predicate table in association with a respective predicate identifier;
a stored attribute predicate, wherein a set of operator and constant attributes are stored in respective columns of the predicate table in association with a respective predicate identifier, and wherein no index is created on the set of operator and constant attributes;
a sparse predicate, in which a predicate identifier associated with a sparse predicate is uncommon in the expression set, and wherein a sparse predicate is stored as data in the predicate table; and
filtering the expression set based on the classification of predicates from the expression set.

13. The method of claim 12, wherein the step of filtering the expression set includes the steps of:
first, filtering the indexed attribute predicates to obtain a first set of expressions that includes one or more expressions for which all of its indexed attribute predicates are true for a given data item;
second, filtering the stored attribute predicates of the first set of expressions to obtain a second set of expressions that includes one or more expressions for which all of its stored attributes are true for the given data item; and
third, filtering the sparse predicates, if any, of the second set of expressions to obtain a third set of expressions that includes one or more expressions for which all of its predicates are true for the given data item.

14. The method of claim 13, further comprising the step of:
publishing the given data item to a subscriber to an information subscription system that has expressed interest in data that meets criteria represented by an expression from the third set of expressions.

15. A computer-readable storage medium storing an index that is built on a table that has a plurality of rows, the index comprising:
concatenated bit vectors, wherein each bit vector is associated with one of an operator and a constant that are each stored in respective columns of the table;
wherein the operator and the constant are associated with a predicate of one or more predicates from a conditional expression that specifies one or more criteria that must be satisfied by data for the data to be of interest to a subscriber to a subscription system.

16. A computer-readable storage medium carrying one or more sequences of instructions for evaluating an expression set that is stored as data in a column of a table, wherein execution of the one or more sequences of instructions by one or more processors causes the one or more processors to perform the steps of:
classifying each predicate from each expression of the expression set as one of,
an indexed attribute predicate, wherein a bitmap index is created based on a set of operator and constant attributes that are stored in respective columns of a predicate table in association with a respective predicate identifier;
a stored attribute predicate, wherein a set of operator and constant attributes are stored in respective columns of the predicate table in association with a respective predicate identifier, and wherein no index is created on the set of operator and constant attributes;
a sparse predicate, in which a predicate identifier associated with a sparse predicate is uncommon in the expression set, and wherein a sparse predicate is stored as data in the predicate table; and
filtering the expression set based on the classification of predicates from the expression set.

17. The computer-readable medium of claim 16, wherein execution of the one or more sequences of instructions by one or more processors causes the one or more processors to perform the step of filtering the expression set by performing the steps of:
first, filtering the indexed attribute predicates to obtain a first set of expressions that includes one or more expressions for which all of its indexed attribute predicates are true for a given data item;
second, filtering the stored attribute predicates of the first set of expressions to obtain a second set of expressions that includes one or more expressions for which all of its stored attributes are true for the given data item; and
third, filtering the sparse predicates, if any, of the second set of expressions to obtain a third set of expressions that includes one or more expressions for which all of its predicates are true for the given data item.

18. The computer-readable medium of claim 17, wherein execution of the one or more sequences of instructions by one or more processors causes the one or more processors to further perform the step of:
publishing the given data item to a subscriber to an information subscription system that has expressed interest in data that meets criteria represented by an expression from the third set of expressions.

19. An apparatus for evaluating an expression set that is stored as data in a column of a table, comprising:
means for classifying each predicate from each expression of the expression set as one of,
an indexed attribute predicate, wherein a bitmap index is created based on a set of operator and constant attributes that are stored in respective columns of a predicate table in association with a respective predicate identifier;
a stored attribute predicate, wherein a set of operator and constant attributes are stored in respective columns of the predicate table in association with a respective predicate identifier, and wherein no index is created on the set of operator and constant attributes;
a sparse predicate, in which a predicate identifier associated with a sparse predicate is uncommon in the expression set, and wherein a sparse predicate is stored as data in the predicate table; and means for filtering the expression set based on the classification of predicates from the expression set.

20. A computer-readable storage medium carrying one or more sequences of instructions for managing expressions in a database, wherein execution of the one or more sequences of instructions by one or more processors causes the one or more processors to perform the steps of:
receiving a first query that includes an expression that defines a first condition relating to a first attribute;
representing the first condition as data in a column of a row of a table;
storing a first value in association with the data, wherein the first value relates to a second attribute;
receiving a second query that specifies a second value associated with the first attribute and a second condition relating to the second attribute; and
executing the second query, wherein executing the second query includes reading, from the column of the row, the data representing the first condition;
determining whether the second value satisfies the first condition;
reading the first value associated with the data;
determining whether the first value satisfies the second condition; and
selecting data to answer the second query based at least on whether the second value satisfies the first condition, and the first value satisfies the second condition.

21. The computer-readable medium of claim 20, wherein execution of the one or more sequences of instructions by one or more processors causes the one or more processors to perform the step of receiving a first query by receiving the first query from a first user of a database application, and wherein the expression defines one or more conditions that must be satisfied by particular data for the particular data to be of interest to the user.

22. The computer-readable medium of claim 21, wherein execution of the one or more sequences of instructions by one or more processors causes the one or more processors to perform the step of receiving the second query by receiving the second query from a second user of a database application, and wherein the second condition must be satisfied by particular data for the particular data to be made available to the first user, thus enabling mutual filtering of data by the first user and the second user.

23. The computer-readable medium of claim 20, wherein execution of the one or more sequences of instructions by one or more processors causes the one or more processors to perform the step of receiving a first query by receiving the first query from a subscriber to an information subscription system, and wherein the expression defines one or more conditions that must be satisfied by particular data for the particular data to be of interest to the subscriber.

24. The computer-readable medium of claim 23, wherein execution of the one or more sequences of instructions by one or more processors causes the one or more processors to perform the step of receiving a second query by receiving the second query from a publisher in the subscription system, and wherein the second condition must be satisfied by particular data for the particular data to be published to the subscriber.

25. The computer-readable medium of claim 20, wherein execution of the one or more sequences of instructions by one or more processors causes the one or more processors to perform the step of receiving the second query by receiving the second query from a publisher in an information subscription system, and wherein the second condition must be satisfied by particular data for the particular data to be published to a subscriber to the subscription system.

26. The computer-readable medium of claim 13, wherein execution of the one or more sequences of instructions by one or more processors causes the one or more processors to perform the step of representing the first condition as data in a column by representing a set of conditions from a plurality of first queries as data in the column, and wherein execution of the one or more sequences of instructions by one or more processors causes the one or more processors to perform the steps of:
creating an index on the column of the table by
grouping predicates from the set of conditions based on predicate identifiers that identify respective attributes from a set of attributes on which the set of conditions are based;
storing in a predicate table sets of predicate operators and constants in association with respective predicate identifiers;
creating a concatenated bitmap index based on a set of predicate operators and constants associated with a particular predicate identifier.

27. The computer-readable medium of claim 20, wherein execution of the one or more sequences of instructions by one or more processors causes the one or more processors to perform the step of storing the first value in association with the data by storing the first value in the row of the table.

28. The computer-readable medium of claim 20, wherein execution of the one or more sequences of instructions by one or more processors causes the one or more processors to perform the step of storing the first value in association with the data by storing the first value in a column that is different than the column in which the first condition is represented.

29. The computer-readable medium of claim 20, wherein execution of the one or more sequences of instructions by one or more processors causes the one or more processors to perform the step of storing the first value in association with data by storing the first value in a table other than the table.

30. The computer-readable medium of claim 20, wherein the expression defines a plurality of conditions relating to a plurality of attributes, and wherein the column of the row of the table stores a representation of the plurality of conditions.

31. An apparatus for managing expressions in a database, comprising:
means for receiving a first query that includes an expression that defines a first condition relation to a first attribute;
means for representing the first condition as data in a column of a row of a table;
means for storing a first value in association with the data, wherein the first value relates to a second attribute;
means for receiving a second query that specifies a second value associated with the first attribute and a second condition relating to the second attribute; and
means for executing the second query, wherein executing the second query includes reading, from the column of the row, the data representing the first condition; reading the first value associated with the data; determining whether the first value satisfied the second condition; and
means for selecting data to answer the second query based at least on whether the second value satisfies the first condition, and the first value satisfies the second condition.

32. A computer-implemented method for managing expressions in a database, the method comprising the steps of:
- receiving a plurality of queries, wherein each of the plurality of queries includes a respective expression that defines a condition relating to a respective attribute;
- grouping at least a portion of the conditions into one or more groups, wherein the one or more groups are based on the attributes to which the conditions are related;
- representing the conditions as data in one or more columns of a table; and
- for a group from the one or more groups, constructing an index on at least one of the one or more columns in which the data is represented.

33. The method of claim 32, comprising the step of:
persistently storing the index in the database.

34. The method of claim 33, comprising the steps of:
- in response to receiving a query that specifies a value associated with the attribute to which the conditions in the group are related,
  - reading the index from persistent storage; and
  - using the index to filter the conditions in the group based on the value from the query.

35. A computer-readable storage medium carrying one or more sequences of instructions for managing expressions in a database, wherein execution of the one or more sequences of instructions by one or more processors causes the one or more processors to perform the steps of:
- receiving a plurality of queries, wherein each of the plurality of queries includes a respective expression that defines a condition relating to a respective attribute;
- grouping at least a portion of the conditions into one or more groups, wherein the one or more groups are based on the attributes to which the conditions are related;
- representing the conditions as data in one or more columns of a table; and
- for a group from the one or more groups, constructing an index on at least one of the one or more columns in which the data is represented.

36. The computer-readable medium of claim 35, wherein execution of the one or more sequences of instructions by one or more processors causes the one or more processors to perform the step of:
persistently storing the index in the database.

37. The computer-readable medium of claim 36, wherein execution of the one or more sequences of instructions by one or more processors causes the one or more processors to perform the steps of:
- in response to receiving a query that specifies a value associated with the attribute to which the conditions in the group are related,
  - reading the index from persistent storage; and
  - using the index to filter the conditions in the group based on the value from the query.

* * * * *

UNITED STATES PATENT AND TRADEMARK OFFICE
CERTIFICATE OF CORRECTION

| | | |
|---|---|---|
| PATENT NO. | : 7,127,467 B2 | Page 1 of 1 |
| APPLICATION NO. | : 10/254383 | |
| DATED | : October 24, 2006 | |
| INVENTOR(S) | : Aravind Yalamanchi et al. | |

It is certified that error appears in the above-identified patent and that said Letters Patent is hereby corrected as shown below:

COLUMN 16

Claim 10: Lines 60-61, delete "second query specifies a second set of one or more criteria that must be satisfied by data for the data" and insert --second condition must be satisfied by particular data for the particular data--.

COLUMN 20

Claim 31: Line 48, delete "relation" and insert --relating--.

Line 59, delete "condition;" and insert --condition; determining whether the second value satisfies the first condition;--.

Line 61, delete "satisfied" and insert --satisfies--.

Signed and Sealed this

Ninth Day of January, 2007

JON W. DUDAS
*Director of the United States Patent and Trademark Office*